March 28, 1950 L. BROCKMAN 2,501,986

SINGLE CHANNEL TWO-WAY COMMUNICATION SYSTEM

Filed June 7, 1945 5 Sheets-Sheet 1

L. Brockman, Inventor

By Neil D. Preston, his Attorney

March 28, 1950 L. BROCKMAN 2,501,986

SINGLE CHANNEL TWO-WAY COMMUNICATION SYSTEM

Filed June 7, 1945 5 Sheets-Sheet 2

L. Brockman, Inventor

By Neil W. Preston, his Attorney

March 28, 1950 L. BROCKMAN 2,501,986

SINGLE CHANNEL TWO-WAY COMMUNICATION SYSTEM

Filed June 7, 1945 5 Sheets-Sheet 3

Inventor

L. Brockman,

By Neil W. Preston, his Attorney

SINGLE CHANNEL TWO-WAY COMMUNICATION SYSTEM

Filed June 7, 1945 5 Sheets-Sheet 4

Inventor
L. Brockman,

By Neil W. Preston,
his Attorney

March 28, 1950 L. BROCKMAN 2,501,986

SINGLE CHANNEL TWO-WAY COMMUNICATION SYSTEM

Filed June 7, 1945 5 Sheets-Sheet 5

Inventor

L. Brockman,

By Neil W. Preston, his Attorney

Patented Mar. 28, 1950

2,501,986

UNITED STATES PATENT OFFICE 2,501,986

SINGLE CHANNEL TWO-WAY COMMUNICATION SYSTEM

Lyle Brockman, Rochester, N. Y., assignor to General Railway Signal Company, Rochester, N. Y.

Application June 7, 1945, Serial No. 598,066

26 Claims. (Cl. 250—6)

This invention relates to communication systems for transmitting intelligence verbally or otherwise by modulation of a carrier frequency, and more particularly pertains to such a system adapted for use in connection with communication with and between mobile units.

The type of communication system more particularly contemplated in accordance with the present invention is one in which messages or instructions are communicated to and from mobile units on railroads, or the like, by modulation of a carrier frequency in accordance with a voice message or other intelligence which carrier frequency may be employed in connection with space radiation as in the usual radio system, or by induction into line wires, track rails, or conductors along the line of movement of the mobile units in a manner commonly referred to as a wired radio or carrier current system. It is further contemplated that the system of the present invention will be adapted for use in communicating between two or more mobile units; and all communication between stations regardless of their location is assumed to be over the same carrier frequency channel.

Although the system of the present invention may be used in various ways, it is believed to be particularly adaptable for use on railroads where several different situations are found requiring in each case an organization operable to provide substantially immediate use of the communication channel by certain stations regardless of its existing use by other stations in order to effect the safe and reliable communication necessary for railroads. For example, in classification or hump yards on a railroad, it is essential for the safe operation of locomotives, that the wayside or hump located operator be able to instruct any desired engineer immediately as to any trouble or situation in which his train should be stopped. In the case of a pusher engine moving cars over the hump, it may happen that the man uncoupling the cars is unable to accomplish his task or some other emergency arises, and in such a case it is necessary for the hump located operator to immediately advise the engineer to stop his locomotive. If a single channel of communication is provided between the wayside station and the several locomotives, then the use of that channel by the various locomotives between each other would hinder or prevent the wayside operator from having immediate use of the channel to advise an engineer what to do.

Another application of communication systems to railroads involves the provision of communication between the front and rear ends of a train so that instructions and information can be handled between the engineer of the locomotive and the conductor of the train. It may be that communication is being carried on between the front and rear ends of a train, when a wayside operator has information which should be immediately transmitted to the train crew. Similarly, in this case if a single channel of communication is provided, it is obvious that the use of such channel by the train stations would hinder the proper communication from the wayside to the train stations.

Still further complication arises in the provision of train communication systems for railroads when it is appreciated that trains often follow each other at relatively short intervals, and also provisions are made for trains to pass each other in opposite directions. It is thus apparent, that, when communication is provided between the front and rear ends of each train, the proximity of another train will interfere with communication on the first train. Thus, if a single channel of communication is provided with regard to all trains on the same railroad, it may be necessary in order for a conductor to communicate with the engineer of the locomotive on his train to interrupt or break-in on the communication then existing on the communication channel as being used by some other train.

In the situation just explained, it may be that communication is established each between two different trains, or between the front and rear ends of a particular train, and the operator along the wayside has information which is necessary to communicate to the trains at once in order to prevent collision or other types of accidents. Under such circumstances, it may be desirable for the operator along the wayside to be able to break-in upon the communication channel regardless of the use to which it is then being put.

In view of the above considerations, it is proposed to provide a two-way communication system using the same frequency channel for both directions with respect to all stations including both wayside and mobile stations with provisions made for the breaking into that channel by a superior station under the desired circumstances, and also with provision for an inferior station to break-in upon communication under the proper conditions. In accomplishing this purpose of the present invention, it is further proposed that the break-in characteristics of the system shall be so organized as to not interfere with the normal operation of the system during regular communication of messages. In other words, it is desired to organize the communication system so that an operator in effecting the transmission of his message will not be handicapped by the break-in features under ordinary conditions, such as having to stop his message transmission at spaced intervals to allow a break-in period to take place.

In some cases, it may be desirable to make all stations of equal rank, that is, break-in conditions can be indicated but not enforced; while in other cases a particular station may be made arbitrarily superior to one or more other stations, so that such superior station will not only be able to break into the communication channel, but may also be superior in the sense that it can continue its transmission once initiated until its message has been completed regardless of any other station.

In other cases, it may be desirable, as above indicated to have stations of equal rank provided with means operative under special conditions for breaking-in upon the communication channel, and this type of break-in may be accomplished in several different ways. In one form of the present invention, it is proposed that such special break-in facility be of limited duration so that any superior station may still maintain its superiority after the lapse of such limited time. Furthermore, this type of break-in maintains the equal rank or status between stations, since it is contemplated that the conditions requiring break-in are not likely to arise with respect to more than one station at a time.

Generally speaking and without attempting to define the exact nature and scope of the invention, it is proposed to provide a communication system having a plurality of stations each provided with a radio receiver and a radio transmitter so interrelated by suitable control means that the receiver is normally active for the reception of carrier signals that may be modulated with any desired message while the transmitter is normally maintained inactive. The control means for each station is so organized that an operator may initiate the operation of the associated transmitter for the transmission of carrier signal pulses separated by short intervals of time; and during each transmission of carrier pulses the receiver is rendered inactive, but is temporarily rendered active during each of the time intervals between pulses. It is contemplated that these short intervals of time separating the successive carrier signal pulses are of such short duration that under normal conditions of transmission these intervals do not affect the proper and intelligible transmission of the message by the modulation of the carrier signal pulses; while at the receiving station the presence of these short intervals is not noticeable to the operator receiving the message because such intervals are of supersonic duration (i. e. too short to affect the human ear).

Suitable means is also associated with each station which may be conveniently termed lock-out means; and this lock-out means is rendered effective, by the reception of a carrier signal by its associated receiver while it is active, to maintain such receiver active and to prevent further transmission by its associated transmitter until the reception of such carrier signal ceases. An organization is thus provided so that the transmission of a carrier signal by any particular station is interspersed with what may be termed short break-in intervals during which the reception of a carrier signal from some other station may interrupt or break in upon the transmission from such particular station. The particular manner in which the break-in operation takes place and the manner in which it affects the station first transmitting may take different forms, a plurality of which have been disclosed herein, and which will be described in detail hereinafter. It is sufficient for the present to understand that the break-in periods recur at such frequent intervals in all forms of the invention as to involve no substantial delay in the break-in operation by another station. In this connection, the present invention contemplates the accomplishment of its purposes by the use of electronic devices which are capable of acting in time intervals usually measured in micro-seconds, so that the various functions of the system may be accomplished in such short intervals of time that the effects are supersonic and cannot be heard by an operator in the ordinary use of the system.

One important characteristic of this organization is that the interruption of message transmission of a particular station by another station results in the particular station being immediately advised as to such break-in operation, so that the operator at such a particular station is not falsely or ignorantly continuing what he thinks is proper message transmission but which is actually no transmission at all.

In another form of the present invention, it is proposed to provide an organization in such a way that the recurrence of the break-in periods is at a supersonic rate. Since each of two stations are adapted to transmit pulsed carrier signals, and each station is adapted to be held off from transmission upon the reception of a carrier signal pulse, the initiation of transmission by two such stations at the same time results in the alternate transmission of their carrier signal pulses as well as the alternate reception of such pulses; and in this way effects what may be termed simultaneous two-way communication, although the operators should take turns talking as in the usual telephone system. In other words, the succession of pulses transmitted from each station is at such a supersonic rate and such pulses may be modulated by a message, so that the reception of such pulses at a receiving station effects the proper communication of the message without the presence of such pulsing being audible to the operator receiving the message.

Although this modified form of the invention may be considered to obviate the break-in problem as between two stations taken alone, it will be readily apparent upon consideration of the different situations encountered in applying communication systems to railroads that some situations involve more than two stations, as for example, a third station may desire to break-in on two stations involved in what has been termed simultaneous two-way communication. However, in this connection, it should be appreciated that the same principles of superiority by a station which is capable of transmitting a steady uninterrupted carrier signal prevails, so that such station can interrupt one or more stations transmitting by means of a carrier signal interrupted at the supersonic rate.

These characteristic features of the present invention will be explained more in detail in the further description of the several embodiments of the invention; and various other characteristic features, functions and attributes of a system embodying this invention will be in part pointed out and in part apparent as the description thereof progresses.

In describing the invention in detail, reference will be made to the accompanying drawings in which like reference characters designate corresponding parts throughout the several views, and in which.

Figure 1:
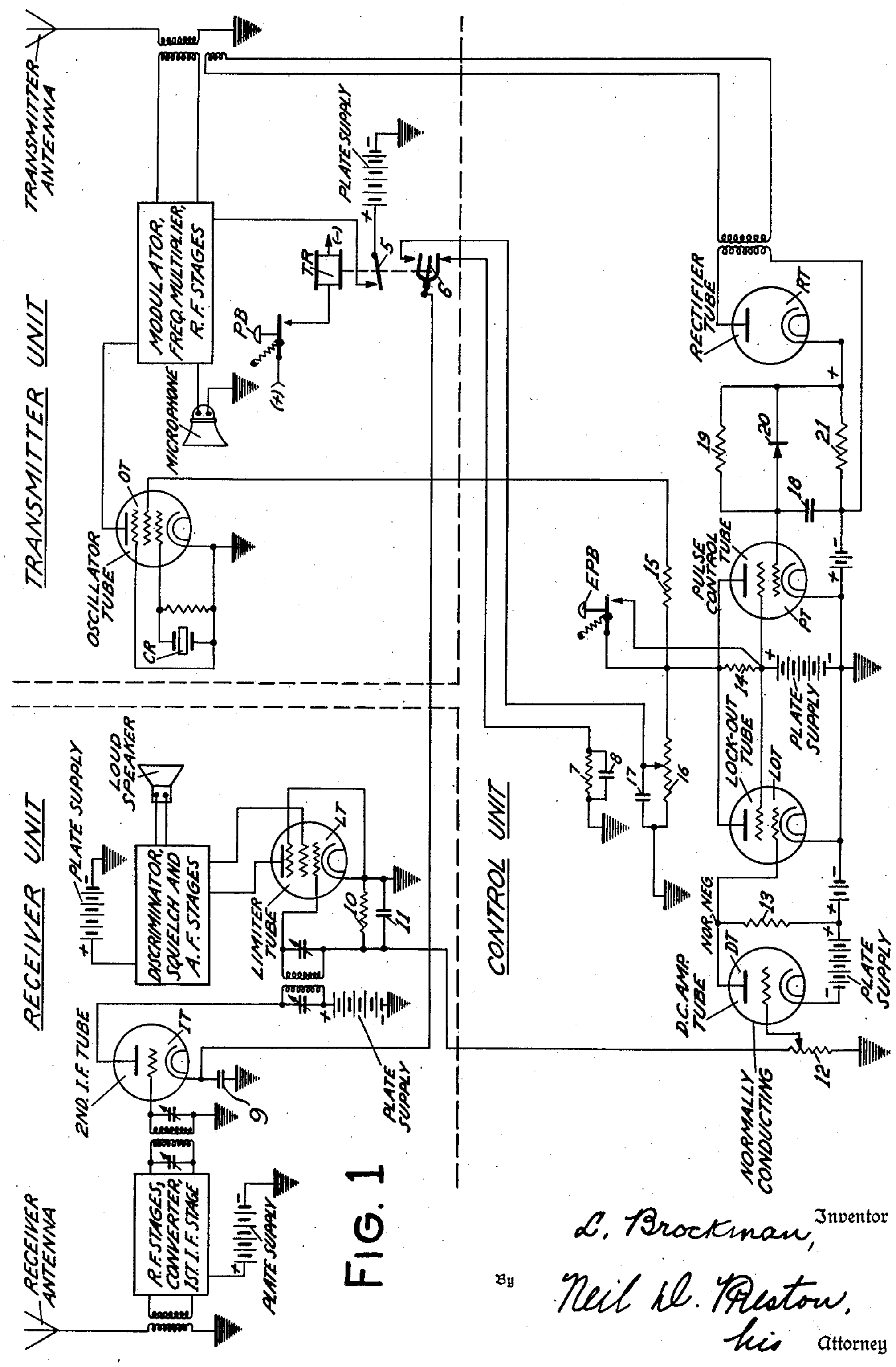
Fig. 1 represents a typical station arranged to provide two-way communication between that station and one or more similar stations on the same carrier frequency channel and adapted to be broken in upon by another station by reason of the fact that its carrier signal is periodically interrupted during transmission for inaudible intervals.

In order to simplify the illustrations in the drawing and facilitate the explanations of the fundamental characteristics of the invention, various parts and circuits have been shown diagrammatically in accordance with conventional symbols. Arrows with associated symbols (+) and (−) are employed to indicate connections of the circuits of the various relays to the opposite terminals of a suitable source of current for the energization of such relays; and the source of current may be of any suitable characteristic for the purpose intended. The various contacts of the relays involved in the illustrations are shown conventionally as being in a lower or inclined position when the coil or winding of the associated relay is de-energized, and in a raised or horizontal position when the relay is energized; the contacts belonging to any given relay are shown connected to its coil or winding by dotted lines, and these contacts may be either below or above the illustration of the relay winding. The front and back contacts between which the movable contacts are operated by the different relays are shown conventionally as arrow heads, and the movable contacts are ordinarily of the type which have their contacts pulled downwardly by gravity or by spring action.

The specific embodiment of the invention chosen for the purpose of illustration and description comprises a radio telephone communication system of the conventional type employing what is known as frequency modulation and operating on a suitable carrier frequency allocated for the particular use of the stations involved;

and in this connection it is contemplated that such frequency channels will ordinarily be in the megacycle band. Although for the purposes of the present disclosure, frequency modulation of the carrier signals is employed, it should be understood that the characteristic principles of the invention may be applied to an organization employing amplitude modulation; and any suitable frequency may be employed with either form of modulation so long as the selected frequency is substantially higher than the pulsing frequencies used in practicing the invention.

Since the structure and operation of radio telephone transmitters and receivers are well understood in the art, no attempt has been made to illustrate the various component parts in their entirety, and only those parts have been shown which have a direct bearing or relationship to the parts necessary for embodying the present invention. In other words, the various component parts of such a system comprising oscillators, intermediate frequency amplifiers, power amplifiers, modulating and de-modulating circuit organization squelch tube circuits, or any other component parts which may be desirable for the practicing of the invention have merely been indicated in a conventional block form. It is also assumed for each of the stations illustrated, that the various sources of energization for supplying potential to the plate circuits, for biasing grids, and for effecting the energization of the tube heaters, and the like, may be provided in conventional and well known ways, the energy sources for the heater elements being entirely omitted, and the sources for the plates and biased grids being shown only in those cases where it is believed expedient to indicate such sources for a better understanding of the invention.

*Typical station of Fig. 1*

With reference to Fig. 1, it will be seen that the station comprises in general, a transmitter unit, a receiver unit and a control unit interrelating the transmitter and receiver unit to effect the functions and operations of the present invention presently to be described.

The transmitter unit includes a "transmitter antenna" indicated as coupled in the usual way to radio frequency amplifier stages which in turn are controlled by a suitable modulator, frequency multipliers, and the like, of a conventional frequency modulated type system. The modulator is of course, controlled by a conventional microphone, and the organization is supplied with a suitable basic frequency from an oscillator tube OT and an associated piezoelectric crystal CR. The basic frequency supplied by the oscillator and its piezoelectric crystal is, of course, multiplied and modulated in the usual way with the resultant carrier frequency suitably amplified by a radio frequency amplifier and then supplied to the antenna for radiation.

A suitable transmit relay TR is controlled by a self-restoring push-to-talk button PB in an obvious manner. When relay TR is actuated it closes its front contact 5 to connect a suitable plate supply to the plate circuits of the various tubes associated with the transmitter unit. This has been shown in this simple way to illustrate that the transmitter unit is normally inactive but can be rendered active by the actuation of the button PB.

The transmit relay TR also acts to initiate operation of the control unit while the button PB is maintained actuated, as will be later described, it being sufficient to note at this time, that while the operator at this typical station of Fig. 1 is conditioned to transmit, the carrier signal being transmitted is interrupted at spaced intervals of supersonic duration by control of the screen grid of the oscillator tube OT. In brief, this oscillator tube OT is effective to produce oscillations of the desired frequency when a plate potential is applied to the transmitter unit and when the proper potential is applied to its screen grid. When the transmitter is to be interrupted, the control unit effects the reduction of the potential on the screen grid of the oscillator tube OT to such a point, that the oscillator ceases its operation and renders the transmitter ineffective at that time. Without considering the circumstances under which this occurs, and the manner in which this reduction in potential is effected, it is desired to point out that this reduction in potential can be accomplished practically instantaneously, that is, within a fraction of a micro-second. The reduction of the potential on the screen grid of the oscillator tube OT immediately stops the production of the basic frequencies of the transmitter unit; but, as is characteristic of tuned circuits, there will be a slight carry-over in the radiation from the transmitter antenna, which carry-over radiation is a transient condition having characteristics related but not the same as the regular carrier frequency signal. Such a carry-over radiation due to the tuned circuits persists for a time dependent upon the frequency involved and the "Q" of the tuned circuits used. In the usual circuits for all practical purposes, this time will be equal to approximately twenty of the carrier frequency cycles. It will be appreciated that, if the carrier frequency is within the megacycle range, such a radiation from the transmitter will be only a small fraction of a micro-second, and will not in any way hinder the practice of the present invention.

The receiver unit of Fig. 1 has a "receiver antenna" inductively coupled to its receiver unit, which includes among other things the radio frequency stages of amplification, the converter stage, and the first intermediate frequency stage. These conventional stages of the receiver are inductively coupled through tuned circuits to the second intermediate frequency tube IT which in turn is inductively coupled to the usual limiter tube LT used in frequency modulation receivers. The output of the limiter tube LT is of course supplied to the discriminator tube, and has associated with it the audio frequency stages of amplification which supply the conventional loud speaker. The receiver unit also includes the squelch tube organization, and other elements belonging to a receiver of the frequency modulation type. This organization has been conventionally illustrated in Fig. 1 by suitable legends and the like.

The radio frequency stages of amplification and the associated apparatus indicated by the rectangle has associated therewith a suitable plate supply connected directly thereto to indicate that this portion of the receiver is continuously active. The second intermediate frequency tube IT has been shown somewhat in detail since the control of the grid bias on this tube is governed in accordance with the present invention to render the receiver active or inactive. More specifically, the transmitter relay TR is normally deenergized, and this being the case, its back contact 6 normally connects the cathode of this second intermediate frequency tube IT through a resistor 7 shunted by a condenser 8 to ground. This resistor 7 and condenser 8 combination is so selected as to provide a proper grid bias for this second intermediate frequency tube IT, to normally render the receiver active and capable of receiving messages which will be reproduced as intelligence by the loud speaker.

The condenser 9 is also connected between the cathode of this intermediate frequency tube IT and ground for the purpose of shunting to ground any radio frequencies higher than those intended to be amplified by the intermediate frequency stage.

Under normal conditions, there is no carrier signal being received by the receiver unit so that there is no intermediate signal frequency applied to the limiter tube. However, as is characteristic of every location there is certain inductive static noises, or transient discharges within the vicinity of the station; and also there are certain undesirable characteristics of the various tubes which produce what is termed electric radio noises. These radio noises would be reproduced by the loud speaker were it not for the so called squelch tube and its related conventional circuits and functions. The noise level, that is, the voltages produced in the receiver by the presence of radio noise and the characteristics of the amplifier tubes is not effective to produce any substantial bias on the squelch tube, so that this squelch tube is effective to render the audio frequency stages of amplification ineffective to reproduce such noises, which of course is highly desirable. When a carrier signal is received by the receiver unit, the level of its voltages is of such a higher amount that the squelch tube is controlled to open up the audio stages of the receiver so to speak and allow the reproduction of the modulating frequency on the carrier signal. In this connection, it is noted that the time elements involved in the response of the squelch tube to the presence of a carrier signal or its absence are such as to be advantageous in the practice of the present invention, as will be described in greater detail as the description progresses.

Referring to the limiter tube LT of Fig. 1 it will be seen that a resistor 10 and a condenser 11 are connected in the circuit to provide the bias on the control grid of this limiter tube. This bias is adjusted so that the limiter tube will pass signals of a given amplitude to properly control the remaining stages of the receiver, but a signal of greater amplitude increases the negative bias on the limiter tube LT and thus tends to maintain the output of the limiter tube substantially constant. For this reason, the limiter tube output is so set with respect to the possible input that there is always some of the received signal which is cut off so to speak by the limiter tube. In this way, any variations in the amplitude of the received signal due to the imposition upon the carrier signal of noise voltages, or a weak distant station transmitting on the same frequency, will automatically be eliminated by the limiter tube. This is characteristic of frequency modulation receivers. This is pointed out more particularly for the purpose of making it clear that under the usual conditions where a carrier signal is properly received, there is always a biasing voltage of negative polarity across the bias resistor 10 and condenser 11, and this voltage is ordinarily several times greater during reception of a carrier signal than when there is no carrier present and just noise potentials are produced. This negative voltage is used in accordance with the present invention for effecting certain operations with respect to the control circuit for accomplishing the lock-out characteristics of the present invention, as will be described in greater detail presently.

Referring to the control unit in Fig 1, it will be seen that four tubes are provided including a direct current amplifier tube DT, a so called lock-out tube LOT, a pulse control tube PT, and a rectifier tube RT. All these tubes are normally inactive except the direct current amplifier tube DT, which is normally conductive. A connection is made to the negative side of the bias resistor 10 in the grid circuit of the limiter tube LT, and this connection is taken to ground through a voltage dividing variable resistor 12. Since there is normally no carrier signal received by the receiver, there is no current flowing through the resistor 10 and hence there is no potential to negatively bias the control grid of the amplifier tube DT, and for this reason the tube is conductive and the plate supply associated with this tube acts to cause a current to flow through the load resistor 13. This current through the load resistor 13 is in that direction which produces a negative potential at its upper end, which is connected to the control grid of the lock-out tube LOT to produce a normal negative bias on the lock-out tube.

It will be noted that a source of positive bias is provided for the control grid of the lock-out tube, but the negative potential drop supplied by the load resistor 13 is sufficient to overcome this positive bias and maintain the lock-out tube LOT non-conductive. Without considering the circumstances under which such operation occurs, it can be understood that when a carrier signal is received by the receiver, such signal causes a potential drop through the resistor 10 which in turn produces a voltage drop in resistor 12 to the control grid of the amplifier DT to negative. This causes such tube DT to be non-conductive and thereby remove the negative bias on the control grid of the lock-out tube LOT allowing its positive bias to take control to cause the tube LOT to be conductive in the usual manner. Under such a circumstance, it is apparent that plate supply of tube LOT will cause a current flow through the resistor 14 and through the plate-cathode circuit of the lock-out tube.

By following the circuit from ground through the plate supply, resistor 14 and resistor 15 to the screen grid of the oscillator tube OT, it will be apparent that the oscillator tube is normally in a condition to be operated when its plate supply is connected by closure of front contact 5 of relay TR. But whenever the lock-out tube LOT becomes conductive and causes current to flow through the resistor 14, then the potential on the screen grid of the oscillator is reduced to such a low value that the oscillator tube OT can not be operated regardless of the closure of front contact 5. Thus, the reception of carrier signal by the receiver acts to render the oscillator tube OT ineffective or inactive.

*Operation of Fig. 1*

Let us assume that the operator at the typical station shown in Fig. 1 is not receiving any message and desires to transmit a message to some other suitable station. To do this, he actuates the push-to-talk button PB to energize relay TR. This shifts the cathode of the second intermediate frequency tube IT from the resistor 7 and condenser 8 bias combination to the resistor 16 and condenser 17 bias combination by reason of the movement of contact 6 of relay TR from a back to a front contacting position. Since there is no carrier signal being received at the time of this operation, the amplifier tube DT is normally conducting and the lock-out tube LOT is not conductive for reasons previously explained. This means that even though the condenser 17 and resistor 16 combination connected by front contact 6 of relay TR would ordinarily be suitable to provide proper bias on the second intermediate frequency tube IT for reception purposes, the plate supply battery applied a potential across the resistor 16 increasing the positive potential applied to the cathode of tube IT so that the effect is to produce a strong negative bias on the control grid of this tube to such a degree that it is cut-off and can not pass a carrier signal even though one should be received by the antenna and the preceding amplifier stages.

In brief, when resistor 14 is not acting as a load resistor, a high potential is applied to the screen grid of the oscillator and the cathode of an intermediate frequency amplifier, thereby conditioning the oscillator for operation and preventing operation of the receiver. On the other hand, when resistor 14 is drawing a load, the potential on the screen grid of the oscillator is reduced to render it ineffective, while such reduction of potential on the cathode of tube IT renders it active for reception.

Under normal conditions the rectifier tube is, of course, inactive, so that the control grid of the pulse control tube PT being biased to negative, such a tube is not conductive. The picking up of the transmit relay TR applies plate potential to the oscillator, the associated modulator, frequency multiplier and radio frequency stages of the transmitter, so that the transmitter is immediately ready for the transmission of a message as soon as the front contacts of the transmit relay TR are closed. The operator may now speak into the microphone and transmit such messages as he may desire, it being understood that the transmitting condition is maintained by his holding depressed the push-to-talk button PB.

During the transmitting operation of the station apparatus, the control unit is so governed, as to intermittently interrupt the transmitter, and during such interruptions to render the associated receiver momentarily active. This is illustrated for this typical station in Fig. 5A, where normally there is no carrier signal transmitted, but when the push-to-talk button PB is operated a series of carrier pulses are transmitted separated by intervals which are of a supersonic duration. The carrier pulses are of course capable of being modulated with the messages to be transmitted and these pulses may be of any suitable duration such as one or two seconds or the like. The recurrence of the supersonic interruptions does not at all interfere with the proper and intelligible transmission and reception of the messages.

In connection with these recurring intervals between the pulses, it should be understood that they may be as long as one or two thousandths of a second, since the human ear requires that a sound frequency persist for at least three thousandths of a second before it can be heard. This, of course, assumes that there is a substantial time greater than three thousandths of a second between successive intervals or interruptions in the transmission, because recurring frequencies must be at or above twenty thousand cycles per second in order to be definitely supersonic. However, it should be understood that the intervals or interruptions in the transmission of the carrier frequency signals should be as short as practicable, and may be as short as four or five micro-seconds. In view of the above, it will be understood that these intervals or interruptions in the transmission of the carrier frequency have been designated supersonic intervals in the sense that they are so short as not to be audible, or appreciably affect the intelligibility of the message transmission and reception.

More specifically, this pulsing operation is effected by the provision of an inductive coupling between the antenna coupling and a rectifier tube RT. The energy which is removed from the radiating signal by this coupling is supplied to the rectifier tube RT which in turn rectifies it and places a direct current voltage across the pulse timing circuit which includes condenser 18, resistor 19, rectifier 20 and resistor 21. The limiting resistor 19 acts to determine the time in which direct current must be supplied to the condenser 18 before there is sufficient potential on the control grid of the pulse control tube PT to counteract the normal negative bias supplied to such grid and result in the rendering conductive of this pulse control tube. As will be readily appreciated by all skilled in the art, the time of charging the condenser 18 is determined by the relation of the resistance of the limiting resistor 19 to the capacity of the condenser 18. The leak resistor 21 must also be supplied by current from the rectifier tube RT, but since the leak resistor 21 is in multiple with resistance 19 and condenser 18, it has practically no effect on the timing combination at this time.

A rectifier unit 20 is shown as being in multiple with the timing resistor 19. During the time that the condenser 18 is being charged through the resistor 19 as supplied with direct current from the rectifier tube RT with the cathode acting as the positive terminal, the rectifier unit 20 does not allow the current to flow because the right hand terminal of this rectifier unit 20 is connected directly to the positive side of the direct current supply.

In this connection, it is noted that the rectifier unit 20 has been illustrated as a simple dry plate rectifier, such as of the copper oxide or selenium cell type; but this rectifier unit 20 may be of any suitable type such as a vacuum tube rectifier similar to the tube RT. The particular type of rectifier will be determined by the particular timing constant selected for embodying the invention.

When the control grid of the pulse control tube PT has been made sufficiently positive by the charging of condenser 18 to cause the pulse control tube PT to be conductive, as will be explained presently, the transmitter stops operation and the rectifier tube RT ceases to supply a positive potential to the right hand terminal of the rectifier unit 20. Thus, the positive charge on the upper plate of the condenser 18 acts to immediately render the rectifier 20 conductive and discharge the condenser through the leak resistor 21. The time required to discharge the condenser 18 determines the time interval of the space between pulses transmitted by the transmitter. Under some combinations of resistance values, it may be desirable to use a vacuum tube instead of the rectifier unit 20, because a vacuum tube has a higher inverse resistance and gives a more rapid control action.

It will, of course, be appreciated that only a very small amount of energy should be removed from the antenna circuit to operate this pulse timing organization in order to maintain the efficiency of the transmitter. Also, the energy for the rectifier tube RT can be obtained from the transmitter at some intermediate stage of amplification rather than from the antenna circuit if desired.

When the control grid of the pulse control tube PT is raised to a positive potential to a sufficient degree then the pulse control tube becomes conductive and its plate current flows from the plate supply through the limiting resistor 14. This lowers the potential applied to the screen grid of the oscillator tube OT to such a low value that the oscillator stops its operation as previously described, and the transmitter thus ceases to radiate a carrier signal. At the same time that the potential is decreased to stop the operation of the oscillator tube, the receiver is rendered active because this potential drop in the resistor 14 decreases the bias on the cathode of the second intermediate frequency tube IT to a value where it is rendered active for the reception of a carrier signal. Before considering the operation in the event of the reception of such a carrier signal, let us assume that no carrier signal is received and the timing operation of the pulse control tube continues.

As soon as the oscillator tube OT ceases to be effective, energy ceases to be supplied to the rectifier tube RT so that there is no positive potential supplied to the control grid of the pulse control tube PT, except that stored in the condenser 18. Thus, after a short interval of time the condenser 18 is discharged by the leak resistor 21 in series with the rectifier unit 20, so that the normal negative bias is restored to the control grid of the pulse control tube PT. This, of course, renders the pulse tube PT non-conductive, and thus restores the potential of the plate supply to the screen grid of the oscillator tube OT and the cathode of the tube IF. This again prevents operation of the receiver and renders the transmitter active by providing the basic frequency for the transmitter.

The presence of a carrier signal in the antenna acts to transfer energy to the rectifier tube RT so that the timing operation again takes place. It will thus be seen that the pulse control tube PT is repeatedly rendered conductive and non-conductive alternately in accordance with the timing characteristics of the pulse timing circuit organization including the limiting resistor 19, condenser 18, leak resistor 21 and rectifier unit 20.

Figure 5A:
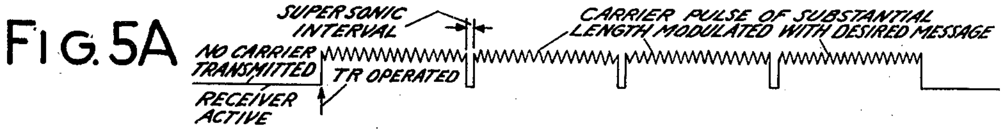
Figs. 5A, 5B, 5C and 5D represent graphically various conditions involved in the functioning of the different forms of typical stations shown in Figs. 1, 2, 3, and 4.

This repeated operation of the pulse control tube PT, so long as the push-to-talk button PB is operated, causes the transmitter to radiate a succession of carrier frequency signal pulses. These pulses, as indicated in Fig. 5A, are of substantial length and may be modulated in accordance with any desired message. As shown, a microphone is provided into which an operator may speak and the voice message acts through the modulator to modulate the carrier frequency pulses in accordance with the voice frequencies. Since the short intervals of time separating the successive pulses are of supersonic duration, these intervals do not appreciably affect the proper and intelligible transmission of the message.

During each of these supersonic intervals between pulses, the associated receiver unit is rendered active, but assuming that there is no carrier frequency signal received during such intervals, there is no output by the loud speaker. This is because any radio noise present during such interval is not sufficient to actuate this squelch tube, so that it maintains the receiver closed. The control of the squelch tube is contemplated as being of the usual type wherein a carrier frequency signal must be received in order to open the squelch control and allow the loudspeaker to reproduce the audio frequencies. However, it is contemplated that the squelch control of the receiver unit shall be sufficiently slow as to be unresponsive to the presence or absence of a carrier signal during the short intervals between pulses, which is an added reason why the loudspeaker of the transmitting station is silent under the conditions being discussed.

Figure 6A:
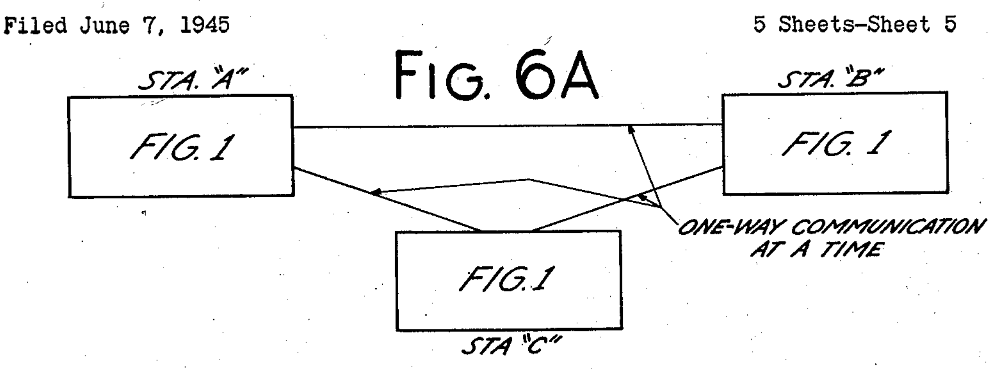
Figs. 6A, 6B, 6C and 6D represent diagrammatically different combinations in which the stations of Figs. 1, 2, 3 and 4 may be organized to provide for different conditions involved in providing train communication.

The above description is more specifically directed to the operation of the typical station of Fig. 1 during the transmitting operation; but, it is believed expedient to discuss the operation of a receiving station more particularly in connection with the combination of stations which may now be considered with more particular reference to Fig. 6A.

*Station combination of Fig. 6A*

It is indicated in this Fig. 6A that a plurality of stations such as shown in Fig. 1 are associated with each other so as to provide two-way communication between each of the several stations. This two-way communication is effected by an operator at one station operating the transmit button PB, transmitting his message, and then releasing the button, followed by transmission from some other station by the operation of the button PB at that station. In other words, the two-way communication is affected by one-way transmission at a time.

Let us assume with reference to Fig. 6A that the station designated A is transmitting to the station designated B. At the station B, the transmitter relay TR (see Fig. 1) is deenergized so that its receiver is active. The succession of carrier signal pulses are thus received at station B, and since the carrier signal is of a value several times greater than the noise level of the location, the squelch tube is operated and opens the receiver so that the loudspeaker reproduces the audio message. It will be noted that since each carrier signal pulse is of substantial duration, the first pulse received by the receiver causes the squelch tube to open up the receiver so that it is immediately effective to reproduce the modulations of that pulse; but since the squelch tube has such control as to cause it to be somewhat slow acting, the occurrence of a break between two successive pulses does not allow the squelch tube sufficient time to close the receiver. For this reason the receiver remains continuously active and the successive pulses of the message are capable of causing the proper reception of the message. As above mentioned, the intervals between pulses are of supersonic or inaudible duration, and any radio noise that may be present during such an interval is not heard from the loudspeaker.

*Break-in operation*

Figure 5B:
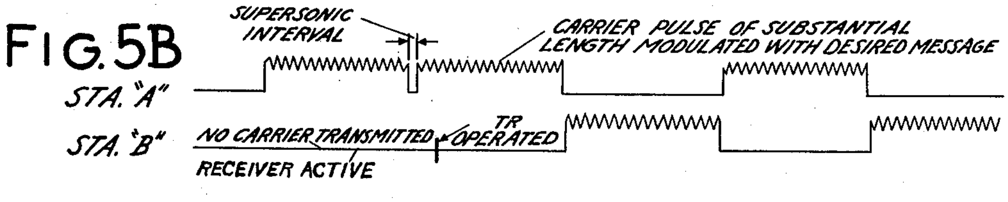

During the reception of a pulse of carrier signal at receiving station B, a negative potential is produced at the left hand terminal of the grid resistor 10 of Fig. 1 and this acts to apply a negative bias on the amplifier tube DT to render it non-conductive. The removal of the load on the resistor 13 causes the control grid of the lock-out tube LOT to be biased positive and allow the lock-out tube LOT to be conductive. The resulting current flow through the resistor 14 causes a potential drop to prevent the oscillator tube OT from being rendered active even though the plate supply should be applied by the closure of front contact 5 of the transmitting relay TR. For this reason, even though the station B of Fig. 6A should desire to break in upon transmission from the station A, it could not do so until the end of the particular pulse then being transmitted by the station A. This is indicated in Fig. 5B by the fact that the carrier pulse transmitted by the station of station B does not occur until a time after the relay TR is operated. Of course, it might happen that the relay TR would be operated at exactly the time that the station A has an interruption in its transmission, but this is unlikely under ordinary circumstances since the interruptions or intervals between pulses are so short.

In other words, the operation of the button PB at the receiving station B results in the picking up of the relay TR and the shifting of the cathode of tube IT from the bias resistor 7 to the bias resistor 16, but because the lock-out tube LOT is conductive at this time, the oscillator OT cannot begin operation until the cessation of reception by station B of the carrier pulse then being transmitted by the station A. The station B of Fig. 6A immediately initiates the transmission of a carrier signal pulse upon the cessation of the pulse transmitted by the station A, and before another pulse can be transmitted by station A. The reception of this pulse at station A acts to render the lock-out tube LOT conductive thus creating such a potential on the oscillator OT at that station as to render it inactive and at the same time lower the potential on the cathode of the tube IT so that its receiver continues to receive. This condition at station A continues until the cessation of the carrier pulse transmitted from the station B, at which time station A initiates its transmitter for the transmission of another carrier pulse. In other words, if the operators at the two stations A and B of Fig. 6A operate their transmit buttons PB at the same time, then the transmitters at the two stations operate alternately to transmit carrier signal pulses. The receivers are of course, also rendered active alternately so that the receiver at station A receives the pulse transmitted from station B; and a similar operation occurs so that station B receives the pulse transmitted from station A. This condition of alternate transmission has been indicated in Fig. 5B, and will persist so long as both stations have their buttons PB operated.

However, the stations are so organized that this condition will be indicated at both stations so that the station A originally transmitting will be advised that station B is trying to break-in and the station B will be advised when the station A withdraws by the release of its button PB to permit the station B to transmit a message. For example, with reference to Fig. 5B it will be seen that the intervals between pulses being received at each of the stations is equal to the transmission time of the pulses. The reception of a carrier signal pulse at each station is sufficiently long to operate the squelch tube and open the receiver, although the squelch tube may not be slow enough to hold the receiver open during the transmission of a carrier signal pulse. Thus, the receiver at each station is successively opened during each of the pulses received, and in the event that the operator at either or both stations is speaking then there will be short periods of speech or sound of a more or less unintelligible character received at both the station originally transmitting and the station B trying to break-in. If desired, some suitable audible tone can be applied at the breaking-in station during such operation, but in any event as soon as the operator at the station originally transmitting hears these intermittent sounds emanating from his loudspeaker he will be advised that another station is trying to break-in and he will release his button PB and allow proper reception, in the manner previously described.

With reference to Fig. 6A, it will be seen that a plurality of stations have been indicated, and any one of these stations may break-in upon any other station in the way just described. However, under some circumstances, it may be desirable to provide a more positive break-in operation, and particularly one that is not contingent upon the original transmitting station withdrawing from the communication channel. Such a means has been shown in Fig. 1 in the form of a break-in push button EPB. This self-restoring push button EPB may be provided at each of the stations for break-in purposes to provide a more positive action under ordinary break-in conditions, or it may be an emergency push button which can be used only under specified condiitons with suitable means insuring that such conditions are complied with.

Figure 5C:
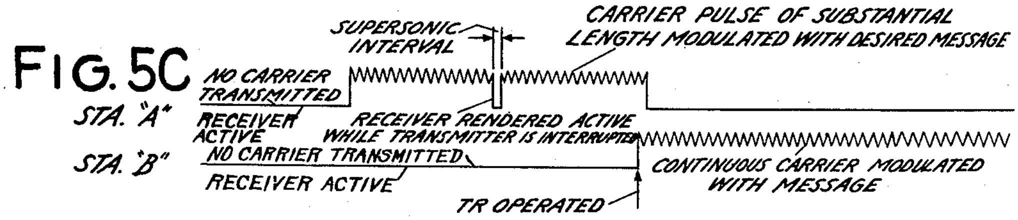

The operation of this button EPB at station B, for example, which is endeavouring to break-in upon transmission from station A results in the transmission of a steady carrier signal by station B, that is, a carrier signal without the recurring interruptions previously described. The operation of the button EPB at station B renders that station immediately effective to transmit a carrier signal regardless of whether a carrier signal is being received from station A, or not, as indicated in Fig. 5C. As soon as the station A ceases its transmission for the usual break-in interval, then its lock-out tube LOT is immediately activated and that station is rendered subject to reception with its transmitter prevented from operation until the station B ceases its transmission. This operation occurs regardless of whether the operator at station A releases his push button PB, or not.

This positive break-in control affected by the push button EPB can be provided in different ways. For example, the push button could be provided in the coupling circuit between the transmitting antenna and the rectifier tube TR so that this circuit could be opened when desired. The operation of such a button would not permit the break-in upon some other station at any time but would permit its station to transmit continuously once it had gained control of the communication channel, because there would be no pulsing operation by the tube PT to allow for a break-in operation by some other station. In other words such a modification in the control of the pulse tube PT would permit the completion of a message being transmitted from a station regardless of the other stations, but would not permit the breaking in upon other stations. Thus, it should be understood that the lock-out tube LOT and its associated devices and circuits can be employed without the use of a pulse timing organization to provide an interlock between a receiver and a transmitter so that the transmitter cannot operate while the receiver is in operation.

Figure 2:
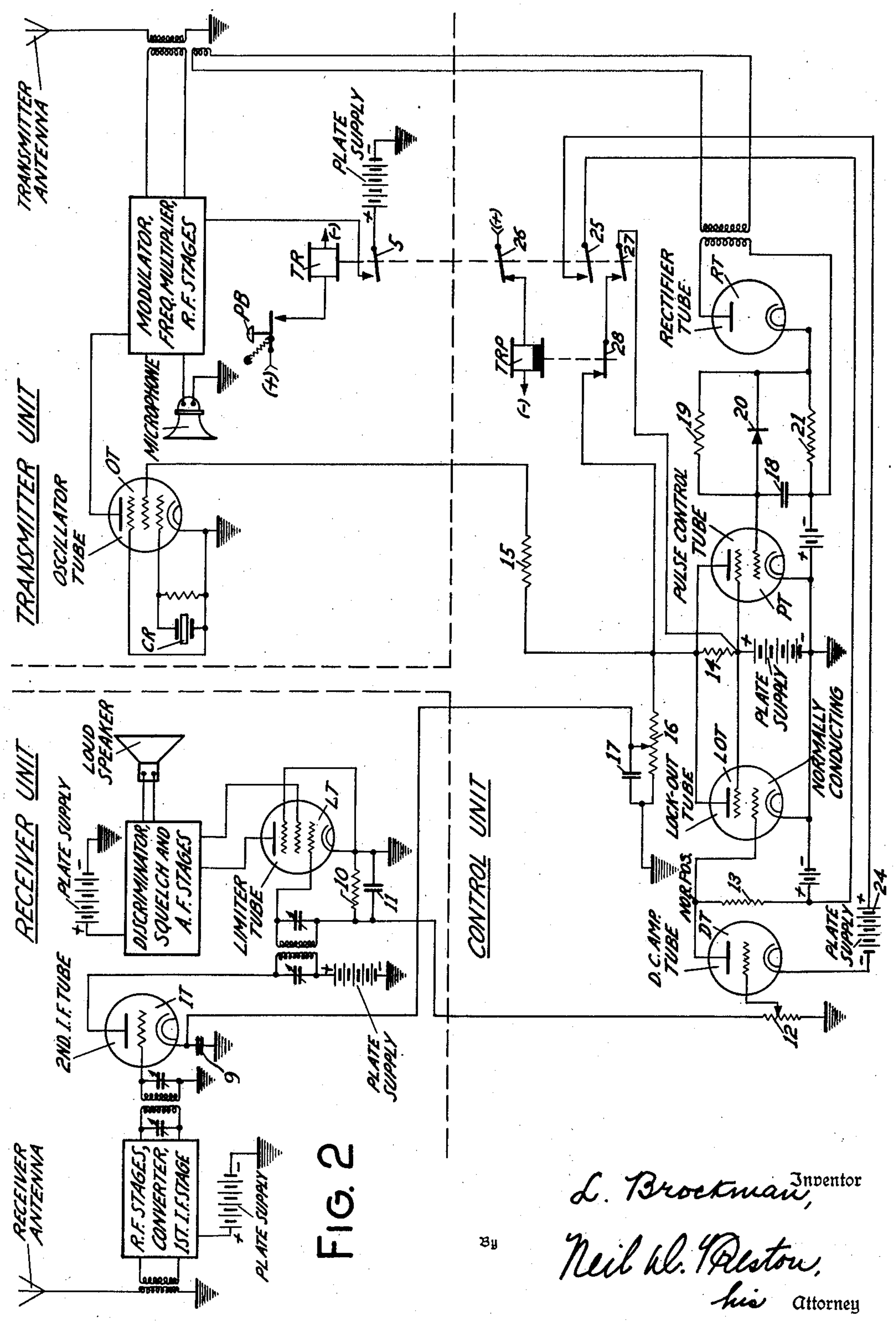
Fig. 2 represents a modified form of typical station shown in Fig. 1, and is provided with the break-in features characteristic of the present invention.

*Modified typical station of Fig. 2*

This modified form of the invention includes substantially the same devices shown in Fig. 1 but with a rearrangement of certain circuits and the addition of a relay TRP normally energized through back contact 26 of relay TR. Thus, the parts of Fig. 2 corresponding to the parts of Fig. 1 have been given the same reference characters. The invention embodied in Fig. 2 involves similar operations and functions as described in connection with Fig. 1, so that only those operations and functions which are different will be described in detail.

In this form of the invention, the amplifier tube DT is not normally conducting because the plate supply 24 is not connected in the plate circuit of this tube DT by reason of open front contact 25 of relay TR. This means that the positive bias on the control grid of the lock-out tube LOT normally renders that tube conductive causing current to flow through the load resistor 14. The upper terminal of the resistor 14 is connected to ground through bias resistor 16 with the condenser 17 in multiple with that portion of the resistor 16 used for biasing the grid cathode circuit of the tube IT. In this connection, it will be noted that the cathode of the second intermittent frequency stage of amplification is connected directly to the bias resistor 16, instead of being selected on a contact of the relay TR as shown in Fig. 1. Since the lock-out tube LOT is normally conductive, the potential drop across the resistor 14 causes the proper bias to be placed upon the tube IT to render it active. In other words, the receiver is normally rendered active because the lock-out tube LOT is normally conductive which condition is maintained because the plate supply 24 is normally removed from the amplifier tube DT.

As above mentioned, the transmitter relay TR is provided with a normally energized repeater relay TRP of the slow acting type. This relay TRP provides by its contact 28 in combination with the contact 27 of relay TR that each time the operator of this station initiates operation of the transmitter by actuating button PB, a steady carrier frequency signal will be transmitted for a limited time after which the carrier signal will be broken up into pulses separated by supersonic intervals, as described in connection with Fig. 1.

Let us assume that the operator at a station such as in Fig. 2 desires to transmit a message. To do this, he actuates the push button PB energizing the transmit relay TR and closing front contact 5 to connect the plate supply to the transmitter. This conditions the transmitter for operation and since the picking up of relay TR closes front contact 27 the potential of the plate supply is connected to the screen grid of the oscillator tube OT so that it is immediately in condition to produce the basic frequency of the transmitter. Thus, a carrier frequency signal is immediately transmitted upon the picking up of the transmit relay TR and it can, of course, be modulated in accordance with any desired message by speaking into the microphone.

The closure of front contact 25 applies the plate supply 24 to the amplifier tube DT, but since the receiver is rendered inactive by reason of the shunting of resistor 14 and application of the high potential to the cathode of the tube IT, there is no negative bias on the tube DT so that it is rendered conductive producing a negative bias on the control grid of the lock-out tube LOT corresponding to the condition during transmission, as described in connection with Fig. 1.

As soon as the transmit relay TR picks up and opens back contact 26, the slow acting repeater relay TRP begins to time, and its release period may be any suitable time, but should be somewhat longer than the duration of the carrier signal pulses. For example, if the pulses should be of one second duration, then the release period of TRP may be in the order of three to five seconds, as desired. Since this relay TRP releases and opens its front contact 28 after a short predetermined time it will be apparent that the operation of the pulse control tube, as described in connection with Fig. 1, will take over and cause the transmitter to transmit carrier frequency pulses separated by supersonic intervals.

It should be understood that this modified form of the invention provides that following the transmission of a steady carrier signal, that the station of Fig. 2 may be broken-in upon by another station during the supersonic intervals between pulses in a manner similar to that described in connection with Fig. 1.

It is believed unnecessary to point out the detailed transmitting and receiving operation in connection with this figure since the pulses of carrier signal are of the same substantial duration and the intervals between pulses are of the same supersonic character. The advantages of this form of the invention reside in the relative superiority between stations as may be best considered with reference to Fig. 6B.

Figure 6B:
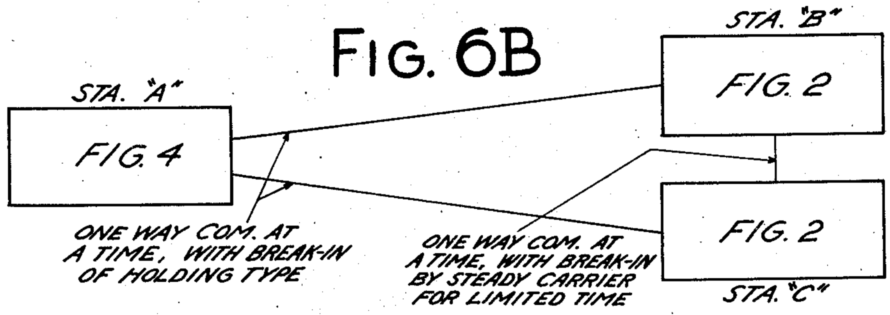

*Station combination of Fig. 6B*

Figure 4:
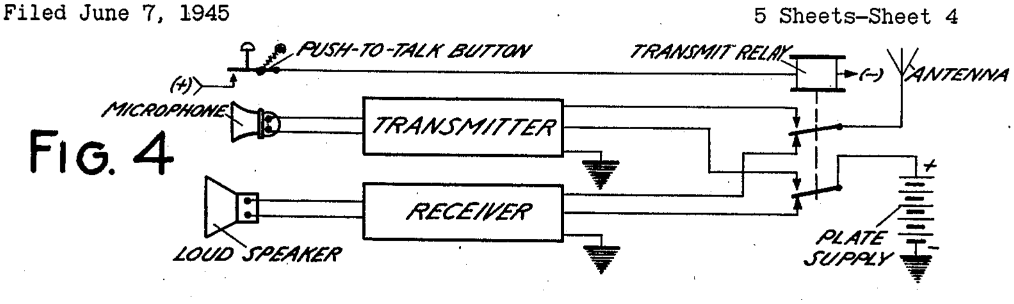
Fig. 4 represents diagrammatically a conventional station providing two-way communication.

In this Fig. 6B, a plurality of stations have been illustrated of which station A is of the conventional type illustrated in Fig. 4 and the others are assumed to be of the type typically shown in Fig. 2. In Fig. 4, a conventional transmitter and receiver are provided with the receiver normally active. Whenever the operator at such station desires to transmit, he operates the push-to-talk button and connects the transmitter to the antenna and renders the transmitter active and the receiver inactive. While the station is transmitting a steady carrier signal, the operator can, of course, transmit any desired message by speaking into the microphone. In other words, Fig. 4 illustrates a conventional radio station which is normally conditioned to receive, but which can be manually conditioned for the transmission of a steady carrier signal that may be modulated in accordance with any desired message.

The stations B and C or any other additional stations that may be associated with station A, are assumed to be of the type shown in the modified typical station of Fig. 2. With this organization, it will be seen that each station can communicate with any other station by transmitting from that station, and this communication is of the two-way type, but transmission can be in only one direction at a time.

Let us assume that the station B of Fig. 6B is transmitting to some other station, such as, station A or another similar station; but that the station C desires to break-in upon such transmission, in order to transmit some message which the operator at station C considers important. To do this all that is necessary is to operate the push button PB of Fig. 2 which causes that station to initiate transmission of a steady carrier signal of limited duration followed by pulsed transmission as described in connection with Fig. 1. Upon the first break-in period of the signal being transmitted by station B, the steady carrier signal transmitted by station C will break-in and hold the transmitter at station B ineffective. During this steady carrier transmission, the operator at station C may give a suitable message indicating the necessity for breaking in upon the communication channel, and the operator of station B will release his push button PB and allow the station C to continue his transmission. This form of break-in gives any station the possibility of break-in upon communication from any other similar station, although it can maintain its superiority for only a limited time after which any other station can then exercise similar characteristics of superiority.

On the other hand in the combination of stations indicated in Fig. 6B, the station A, having apparatus organized as shown in Fig. 4, can transmit a steady carrier signal at any time. Thus, it can break-in upon communication between the stations B and C and other stations by merely initiating its transmission of a steady carrier signal and such transmission may continue as long as the operator at station A desires. This because a steady carrier is received at any transmitting station during a supersonic break-in period between successive pulses and is rendered ineffective for further transmission until such steady carrier ceases, as described in connection with Figs. 1 and 5C. Such superiority of course cannot be effective immediately following initiation from station B for example, since at that time the station B may be transmitting a steady carrier; but as soon as the limited time measured by the drop away of the relay TRP of Fig. 2 elapses, then the station A can be effective to break-in. In this way the several inferior stations typically shown in Fig. 2 are organized to maintain equal ranking between themselves and yet provide break-in at any time except during the limited time that one of the inferior stations is transmitting a steady carrier signal.

Figures 3, 7:
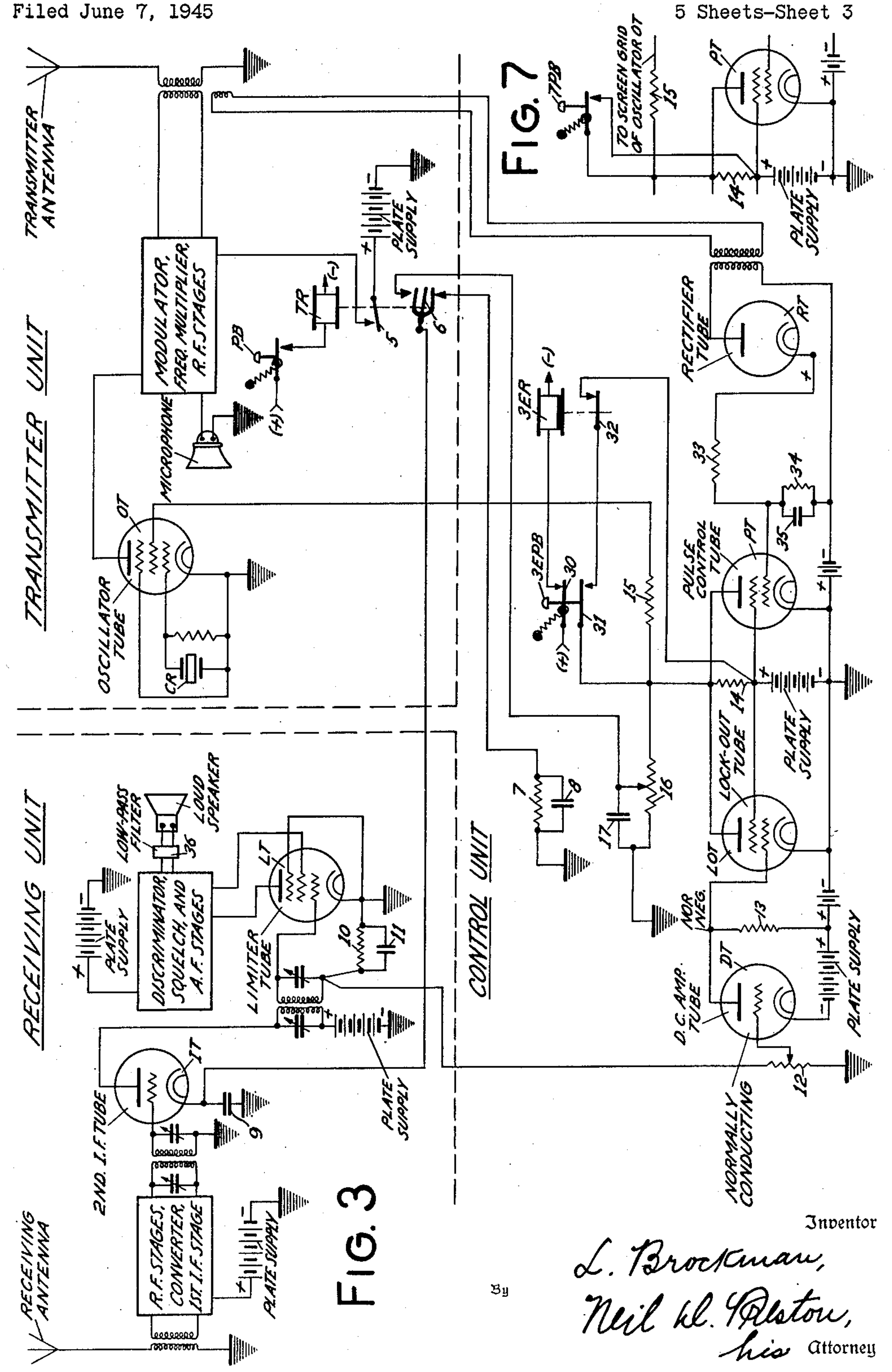
Fig. 3 represents a modified form of typical station providing two-way communication on the same carrier frequency channel but with the automatic break-in feature of the present invention applied thereto in such a way as to provide what has been termed simultaneous two-way communication when two similar stations are communicating with each other.
Fig. 7 illustrates a modification which may be made to station of Fig. 3 to adapt it to form a superior station for the combination of Fig. 6D.

*Typical station of Fig. 3*

The present invention contemplates in this modified form of the invention, that the interruptions of the transmitter may be caused to take place at a supersonic rate, that is, not only are the interruptions of such short duration that they are not audible, but the recurrence of these interruptions is also contemplated as being at a rate above that which is audible. Referring to Fig. 3, it will be seen that the organization is very similar to that shown in Fig. 1 and like parts have been given the same reference characters.

In this form of the invention, the receiver is preferably supplied with a low-pass filter 36 between the loudspeaker and the audio frequency amplifier stages. This low pass filter 36 has such characteristics as to pass all frequencies necessary for voice communication, such as those ranging from 100 cycles to 3000 cycles per second, but it will not pass those frequencies above that range. This filter 36 further assists the system in preventing the pulsing operation involved in the transmission from being discernible by an operator. It should be noted that it may be desirable to allow higher frequencies to be produced in the loud-speaker than those necessary for ordinary voice conversation, and in such case it is assumed that the low pass filter 36 is arranged to pass the desired frequencies but to cut-out the higher frequencies.

In this form of the invention, the pulse timing circuit organization includes the resistor 33, the resistor 34 and the condenser 35, with relative values so selected that the duration of a pulse of carrier signal transmitted by this transmitter unit is of very short duration and each interval between pulses in only a fractional part of a pulse time. For example, it may be that the duration of each carrier pulse may be in the order of 25 to 50 microseconds and the interval between pulses may be in the order of 5 to 10 microseconds. Such a ratio maintains the interruption period at a small percentage of the total time, so that the noise ratio is maintained low at a receiving station, as will be discussed presently.

Figure 6C:
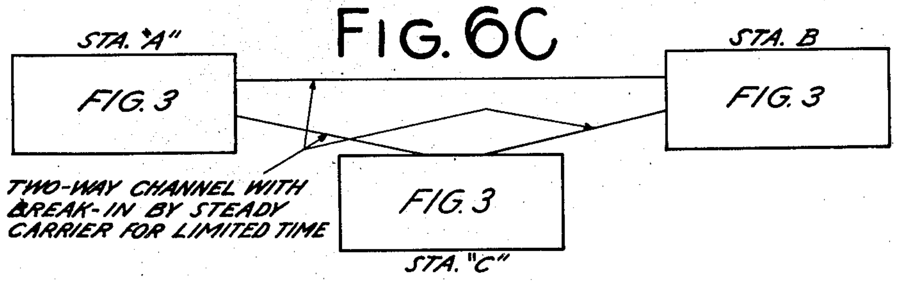

*Station combination of Fig. 6C*

In considering the operation in greater detail, let us assume that there are a plurality of stations similar to the typical station of Fig. 3, located within communicating distance of each other as indicated in Fig. 6 C of the accompanying drawings. Also, let us assume that the station A of Fig. 6C desires to transmit a message to station B for example, it being understood that each of the plurality of stations of the group within the communicating distance are to receive the message transmitted. To do this, the operator actutates the push-to-talk button PB and energizes the transmit relay TR (see Fig. 3).

When the front contact 5 of the relay TR closes, the transmitter is in condition to initiate transmission, while the receiver because of the shifting of the cathode of tube IT from resistor 8 to the resistor 16 by contact 6 of relay TR is rendered inactive.

The oscillator OT produces its basic frequency for the transmitter and causes it to place energy on the antenna circuit, a portion of which energy is coupled to the rectifier tube RT, as previously described. The rectifier tube RT acts to supply direct current through the resistor 33 to the condenser 35 and the leak resistor 34. The pulse control tube PT is normally biased negative, but as the tube RT supplies direct current such as to charge the upper plate of the condenser 35 with positive potential, after a time measured by the resistor 33 in combination with the condenser 35 and leak resistor 34, the condenser 35 will be charged sufficiently positive to cause the control grid of the pulse tube PT to render such tube conductive. This, of course, causes a plate current to flow through the resistor 14 which acts to reduce the potential on the screen grid of the oscillator tube OT so that it ceases operation. This, of course, removes the supply of positive potential from the upper plate of condenser 35 so that it begins to discharge through the leak resistor 34. When the discharge of the condenser 35 has reached that point where the control grid becomes sufficiently negative, due to its normal bias, as to render the tube PT nonconductive, then the proper potential is restored to the screen grid of the oscillator tube OT so that it again renders the transmitter active.

In this way, it can be seen that the pulse control tube PT is rendered conductive for time periods measured by the charging time of the condenser 35 through the resistor 33 and nonconductive for intervals measured by the discharge of the condenser 35 through the leak resistor 34. The value of these pulse timing elements may be varied as required to obtain the desired operation, but in any event a succession of carrier signal pulses are transmitted at a supersonic rate, while the intervals between pulses are of very short duration being only a fractional part of a pulse time.

During each of the time intervals in which the transmitter is rendered inactive by reason of plate current for the pulse control tube PT flowing through the resistor 14, the receiver is rendered active by reason of the change of the cathode to a proper level of positive potential, as previously described in connection with Fig. 1. If no carrier signal is received during the short interval in which the receiver is active, then the transmitter continues to transmit the supersonic carrier pulses which, of course, may be modulated by speaking into the microphone, and such operation continues until the operator releases the button PB. However, should a carrier signal be received, the lock-out tube LOT is rendered conductive and acts to maintain the receiver active and the transmitter inactive in a manner similar to that described in connection with Fig. 1. However, the operating result is somewhat different under the conditions being assumed and will be described presently.

The receiver at the transmitting station A being rendered active at a relatively fast rate, would cause the radio noise present during such intervals to be reproduced by the loudspeaker were it not for the squelch tube which is so controlled that it will not open due to radio noise signals received during such short intervals, but requires that a carrier signal be received in order for the squelch tube to open the receiver for the reproduction of audio frequencies. Thus, at the transmitting station A of Fig. 6C, there is no noise reproduced by the loudspeaker during transmission and the operator may continue his transmission of a message by holding the button PB depressed and speaking into the microphone.

At the station B of Fig. 6C for example, the pulses of carrier signal are received and since these pulses produce voltages in the receiver several times greater than the noise level of the location, the succession of pulse causes the squelch tube at that station to open after a relatively short time so that the modulations superimposed upon the carrier pulses will be reproduced by the loudspeaker. Since the intervals between pulses are short and the squelch tube is slow in its action, the receiver is maintained open for continuous reception.

As above mentioned, the intervals between pulses are a small percentage of the total time so that any radio noise which occurs in the receiver of station B of Fig. 6C is reproduced by the loudspeaker since the receiver is maintained open, but this noise being a low percentage of the signal strength and duration forms but a very low back ground of noise in the loudspeaker. For example, if the duration of an interval is one sixth of the total pulse cycle time, as one example of a possible timing arrangement, and the signal strength is at least two and one half times the noise level of any particular location, then the audio signal volume as reproduced by the loudspeaker will be at least 12 to 15 times the volume of the radio noise reproduced, which will provide a reliable and satisfactory reception of messages.

It may also be noted in this connection that the wave fronts of successive carrier signal pulses may have a tendency to produce in the receiver frequencies corresponding to the rate of carrier signal pulse transmission, but such frequencies are filtered out and not allowed to be reproduced by the loudspeaker, such as by the suitable low pass filter 36. Thus, only communication between stations A and B of Fig. 6C has been considered, but it should be understood that any number of stations, including station C, may be receiving the message in a similar manner as described for station A having its station equipped as typically shown in Fig. 3.

Referring to Fig. 6C, it may be that the station B will desire to reply to the station A, or the two stations may desire to talk back and forth. This may be accomplished in the present form of the invention by both operators pushing their respective buttons PB and holding them in operated positions, rather than each operating his button PB only when he desires to transmit, as would be the case in connection with the other forms of the present invention. For example, let us assume that the station A is transmitting carrier signal pulses when the station B has its button PB actuated. The picking up of the transmit relay TR at station B causes a carrier signal pulse to be transmitted from that station as soon as the next interval occurs in the transmission from station A, but cannot begin to transmit sooner because its receiver is receiving the carrier signal pulse from station A which acts to render the lock-out tube LOT conductive to maintain its receiver active and transmitter inactive, as previously described in connection with Fig. 1.

Upon the occurrence of the next interval at station A, the station B of Fig. 6C is effective to transmit a pulse of carrier signal. This pulse is received by the station A which prevents further transmission from station B, so that the station A can complete the transmission of a pulse. In other words, the stations A and B transmit carrier signal pulses alternately and during such alternate transmission the opposite station is in condition for reception. It is, of course, to be understood that these transmitted carrier signals can be modulated by voice messages whenever the operators at the respective stations speak into their associated microphones.

Figure 5D:
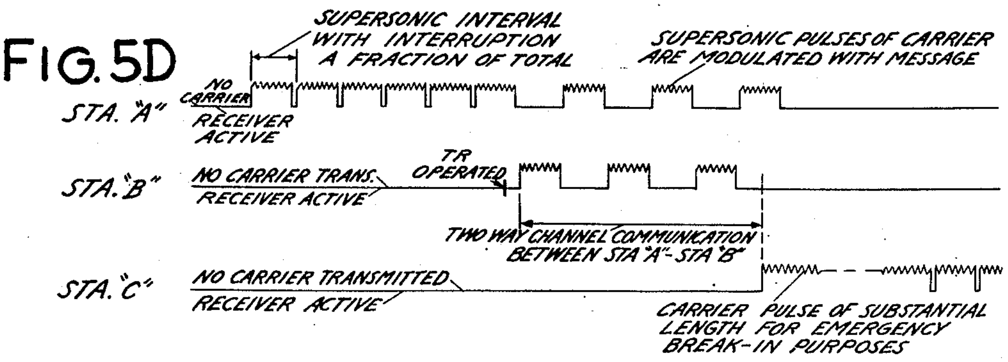

Such operation has been indicated in Fig. 5D, where station A is shown transmitting a series of carrier signal pulses at a supersonic rate with the intervals between pulses being but a fraction of the total time, but when station B initiates its transmission, which regardless of the point at which the relay TR is operated, cannot begin until the next interval of the station A which is then transmitting.

In this way, two stations may transmit impulses alternately in opposite directions between the stations, and because this alternate transmission occurs at a very rapid rate, such as 10,000 to 20,000 cycles per second for example, then the two operators can converse over the communication channel in either direction at will, the same as on an ordinary telephone system, it being assumed that the push-to-talk buttons PB at both stations are maintained operated.

It has been explained above that the squelch tube of each receiver is somewhat slow in its response and when its receiver is receiving a message from another station, the squelch tube maintains the receiver open and does not close during the intervals between the successive carrier signal pulses. When a station is a receiving station and is not endeavouring to transmit at all, then it will be appreciated that the radio noise reproduced in the loudspeaker is small because of the small ratio of the noise with respect to the signal as above explained. However, it might be thought that while the two-way transmission is taking place, and the carrier signal pulses are being transmitted by both stations alternately that considerable noise would be produced in the loudspeaker, because under such circumstances the squelch tube of each receiver must maintain its receiver open in order to receive the message modulation on the successive carrier pulses. In other words, in this form of the invention the squelch tube of a receiver must be sufficiently slow acting as to not close the receiver between successive pulses of carrier signal. But it should be noted that the receiver is actually rendered inactive at a transmitting station by reason of the operation of its associated pulse control tube PT. In other words, the pulse control tube PT in effect accomplishes a similar result as the squelch tube between pulses by rendering the associated receiver inactive for such intervals. In this connection, it is noted that the pulse control tube PT is effective to render a receiver inactive at a point in the receiver in advance of the control of the lock-out tube. This is necessary in order to prevent the transmission of a carrier signal from being received locally and affecting the operation of the lock-out tube falsely.

In other words a receiver must be protected against the pulses transmitted by the associated transmitter. However, it should be understood that if the rendering inactive of the second intermediate frequency amplifier tube IT does not sufficiently squelch the amplification of the receiver during the transmission period while two-way transmission is taking place, and the associated squelch control tube is maintained open, then an auxiliary circuit may be applied to cause the audio portion of the receiver to be closed whenever local transmission is taking place.

In brief, it can be seen that alternate transmission in opposite directions results in reception of a carrier signal by each receiver substantially throughout the time that such receiver is rendered active, and that there is practically no time in which the radio noise of the respective locations can be reproduced in the loudspeaker of either location in this organization. Thus, an efficient two-way transmission is effected in which simultaneous communication in either direction can occur.

With reference to Fig. 6C, it can be seen that where two-way communication is provided between a plurality of stations constructed in accordance with the typical station of Fig. 3, that any one of the stations may communicate with any of the other stations, and that all stations can hear the messages being transmitted. During such message transmission any station may break-in upon the transmitting station and hold what may be termed a simultaneous two-way communication with that station, but under some circumstances it will be desirable for a third station to be able to break-in upon the two-way communication channel. In such instances, it is proposed to provide a break-in for a third station by rendering that station superior for a limited time only in a manner somewhat similar to that described in connection with Fig. 2. However, it can be understood that to make such a station transmit a steady carrier signal of limited duration at the beginning of each transmission. such as described in connection with Fig. 2, would cause unnecessary interruption when only two stations were involved. Thus, in accordance with this form of the invention wherever it is desired to initiate transmission from station C of Fig. 6C while stations A and B are both using the communication channel, the operator at station C operates both buttons PB and 3EPB. The button PB conditions the transmitter and receiver as previously described, while the operation of the button 3EPB opens its contact 30 to deenergize slow releasing relay 3ER. During the release time of this relay 3ER a circuit is closed through the push button contact 31 and front contact 32 of relay 3ER to shunt the resistor 14. This shunting of resistor 14 acts the same as described in connection with Figs. 1 and 2 to cause the steady transmission of a carrier signal which may be modulated with a suitable message, and it will break-in upon the transmission from stations A and B of Fig. 6C. Such transmission of course, occurs for the limited time measured by the release time of the relay 3ER, and after such time has been measured the transmitter acts to transmit carrier signal pulses at the supersonic rate in the manner previously described and indicated in the right hand portion of Fig. 5D. Thus, the station C of Fig. 6C, after having broken-in upon a two-way communication, may also be broken-in upon following the measuring of the predetermined time by the release of the relay 3ER. Although Fig. 6C only shows three stations, it is to be understood that any number of stations may be provided; and since all of the stations are similarly constructed, the same facilities are provided with respect to all stations. In other words, the stations of Fig. 6C are all of equal rank, and yet break-in facilities are provided for all conditions.

Figure 6D:
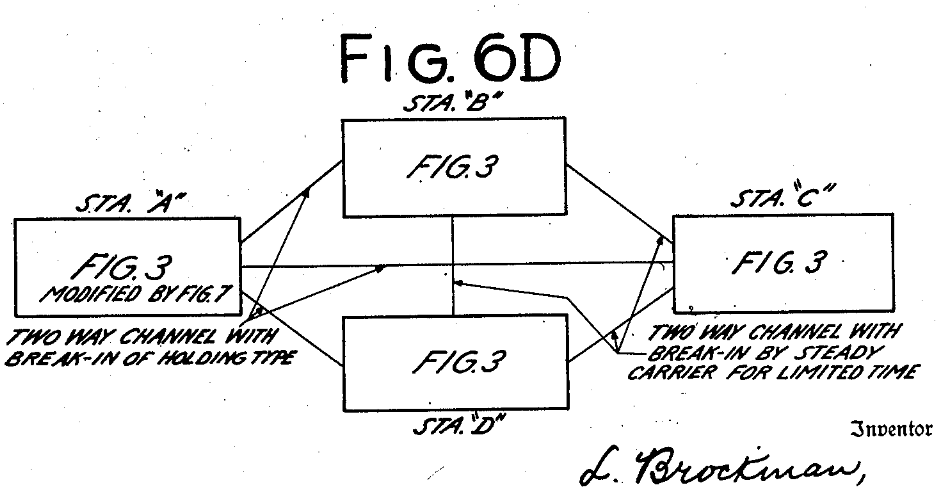

*Station combination of Fig. 6D*

Under some situations in practice, it might be desirable to provide several stations such as the typical station of Fig. 3 in a combination with a superior station. In other words, it might be desirable to provide a station which could terminate the transmission from the others so to speak and maintain its effectiveness to transmit irrespective of any of the other stations. To accomplish this, it would be possible to provide a superior station of the conventional type shown in Fig. 4, but such a station would not be able to hold the so-called simultaneous two-way communication with each of the other stations. Thus, if such a combination of stations were employed, the various inferior stations would have two methods of transmitting, that is, an inferior station would be able to talk with any other inferior station by steadily maintaining the push-to-talk button PB operated, but in communicating with a superior station, it would be necessary to operate its button PB in synchronism with periods of message transmission, in order to clearly maintain in the mind of the operator that the two-way channel operation is not possible under such conditions. To obviate this difficulty, the present invention proposes that the organization of Fig. 6D be employed in which all of the stations are constructed as shown in typical Fig. 3 with the qualification that the superior station A of Fig. 6D be provided with a break-in button 7PB as shown in Fig. 7 in place of button 3EPB and relay 3ER of Fig. 3. This button 7PB, when operated, causes the load resistor 14 to be shunted rendering the station A, thus modified capable of transmitting a steady carrier signal which would act to predominate over all other stations so that the operator of station A could continue his message as long as necessary. On the other hand, regular communication between station A and any other station of the group would be on the same basis as between stations B, C and D for example. In other words, the operator at the superior station would only be required to operate the button 7PB in the event that it was necessary for him to maintain his communication to all stations irrespective of the efforts of the other stations to break-in upon the communication channel.

In brief, each station of Fig. 6D could hold so called simultaneous communication with any other station of the group, and any third station such as stations B, C and D, could break-in upon the channel by using its button 3EPB. However, the superior station could break-in upon any two-way communication and dominate the channel to the exclusion of all others by merely operating button 7PB.

While the present invention has been shown more particularly in connection with radio communication adapted for use in railroad train communication systems, it is to be understood that various of the features disclosed herein are useable with various other types of communication systems, and that specific embodiments of the invention have been selected merely for convenience in describing the characteristic features and functions of the system of this invention. It will of course be appreciated that the specific details of control shown may be varied in different ways and still be within the scope of the invention. For example, the radio transmitter of the different forms may be rendered active and inactive by controlling some stage of the transmitter other than the oscillator tube OT, as shown. Similarly, the receiver of the different forms may be adapted to control the amplifier and lock-out tubes in different ways depending upon the specific organization of the receiver, while the receiver may be rendered active and inactive by controlling the bias on some other tube, or perhaps two or more tubes as required for practical purposes in the specific receiver employed.

Having described a communication system involving several different forms of typical stations as embodiments of the present invention, it is desired to be understood that these forms are taken to facilitate the disclosure of the invention rather than to limit the number of forms it may assume; and it is to be further understood that various modifications, adapters and alternations may be applied to the specific form shown to meet the requirements of practice without in any manner departing from the principles of the present invention.

What I claim is:

1. In a radio communication system for providing two-way communication between a plurality of stations operating on the same carrier frequency, a radio transmitter and a radio receiver for each station operating on the same carrier frequency, control means for each station manually conditioned for operation in connection with the transmission of a message from that station and including timing means for rendering said receiver inactive and said transmitter effective during the transmission of a message except for recurrent supersonic intervals too short to interfere with the intelligibility of the message, and means at each station responsive to the reception of a carrier frequency from some other station during such supersonic intervals for maintaining said receiver active and said transmitter ineffective irrespective of said control means, whereby a station may break-in on another station while it is transmitting a message.

2. In a radio communication system providing two-way communication on the same carrier frequency between a plurality of stations, a radio transmitter and a radio receiver at each station operating on the same carrier frequency, manually controllable means at each station including an electronic device for rendering said receiver inactive and said transmitter effective by manual control to transmit a carrier frequency to be modulated with a message, said electronic device acting to render said transmitter ineffective and said receiver active at recurrent time periods for a supersonic interval so short as not to interfere with the intelligibility of the message, and means at each station including a vacuum device governed by said receiver and responsive to the reception of a carrier frequency from another station during such supersonic intervals for rendering said transmitter ineffective and said receiver active so long as said carrier frequency is being received from such other station, whereby a station even though transmitting a message without interruption with respect to its intelligibility is subject to break-in control from some other station.

3. In a radio communication system of the type described, a radio transmitter and a radio receiver at each of a plurality of stations operating on the same carrier frequency for transmitting and receiving messages, said transmitter and said receiver each having a control circuit for rendering it effective or ineffective, control means at each station including an electronic device and conditioned for operation by manual control in connection with the transmission of a message from that station for governing said control circuits to render the transmitter effective and the receiver ineffective except at recurrent supersonic intervals too short to interfere with the intelligibility of the message, and means at each station including a vacuum tube controlled by said receiver while effective and responsive to the reception of a carrier frequency from some other station during such supersonic intervals for maintaining said receiver active and said transmitter ineffective independently of said control means while said carrier frequency is being received from said other station, whereby a station may transmit a continuous message without interruption with regard to its intelligibility, but is subject to break-in control from some other station.

4. In a radio communication system providing two-way communication on the same carrier frequency, a station having a transmitter and a receiver both adapted to operate on the same carrier frequency, said receiver being normally active for the reception of a carrier signal, and said transmitter being normally inactive, control means manually operable to initiate operation of said transmitter for transmitting a carrier signal and acting to render said receiver inactive, pulsing means set into operation upon the initiation of said transmitter to recurringly interrupt the transmission of the carrier signal being transmitted by said transmitter for a supersonic interval at time spaced periods and also acting to render the associated receiver active during such intervals, whereby another station can receive a message from said transmitter without interference from said recurring interruptions, and a lock-out means responsive to the reception of a carrier signal by said receiver during any interruption of said transmitter for continuing said receiver active and holding said transmitter inactive independently of said control means, whereby another station transmitting a carrier signal can break in upon transmission from said station during any of the recurring interruptions of its transmission.

5. In a radio communication system providing two-way communication between a plurality of stations operating on the same carrier frequency, a radio transmitter and a radio receiver for each station adapted to operate on the same carrier frequency, control means for each station normally rendering said receiver active and its associated transmitter inactive but being manually governable to render said receiver inactive and said transmitter active for transmitting a carrier signal divided into pulses by recurrent intervals of time so short as to not interfere with the intelligibility of a transmitted message and during such intervals rendering said receiver active, and means at each station responsive to the reception of a carrier signal from some other station only during said short intervals for maintaining its associated receiver active and said transmitter inactive independently of said control means until such carrier signal ceases, whereby the manual governing of the control means at two stations at the same time results in transmission of a carrier by such two stations alternately advising each as to the existing condition.

6. In a communication system providing two-way communication between a plurality of stations operating on the same carrier frequency, a radio transmitter and a radio receiver for each station adapted to operate on the same carrier frequency, control means for each station capable of being manually set into operation for causing the associated transmitter to transmit pulses of carrier signal separated by supersonic intervals and during such intervals rendering the associated receiver active, lock-out means at each station governed by its associated receiver in response to the reception of a carrier signal from some other station during a supersonic interval in which the receiver is rendered active for causing the associated control means to be rendered ineffective and for maintaining the associated receiver active for the reception of said carrier signal until it ceases, and manually operable means effective for a limited time only following manual operation for acting on said control means to cause said transmitter to transmit an uninterrupted carrier for a limited time when said control means is manually set into operation, whereby any station may break-in upon the transmission from any other station during a supersonic interval in the transmission from such other station but after said limited time being itself subject to being broken-in upon by some other station.

7. In a radio communication system for providing two-way communication between a plurality of stations operating on the same carrier frequency, a radio transmitter and a radio receiver for each station operating on the same carrier frequency, said receiver having a multiple element electronic tube as an intermediate frequency stage, control means for each station normally rendering the associated receiver active and the associated transmitter inactive by application of proper biasing potentials to said stage of said receiver and to a multiple element electronic tube of said transmitter respectively, said control means being manually conditioned to initiate operation of said transmitter to transmit pulses of carrier signal separated by supersonic intervals and acting to render said biasing potential of said stage such as to cause said receiver to be inactive during the transmission of such pulses but to be active during the intervening supersonic intervals, and lock out means at each station including a vacuum tube having its control grid governed by a potential depending upon the reception of a carrier signal only while said receiver is rendered active to render said control means ineffective to cause operation of said transmitter and to continue the proper bias potential on said stage of said receiver for the continued reception of said carrier signal.

8. In a radio communication system for providing two-way communication between a plurality of stations operating on the same carrier frequency, a radio transmitter and a radio receiver for each station adapted to operate on the same carrier frequency, control means at each station manually conditioned for initiating the transmission of carrier signal pulses separated by supersonic intervals too short to interfere with the proper transmission of a message, said control means acting during each pulse of carrier signal to render the associated receiver inactive but acting to render such receiver effective for the reception of a carrier signal during each supersonic interval between pulses, lock out means at each station responsive to the reception of a carrier signal from some other station during a supersonic interval for maintaining the associated receiver active and the associated transmitter inactive irrespective of said control means, and manually operable means at each station effective for initiating operation of the associated transmitter to transmit an uninterrupted carrier signal irrespective of said control means and maintaining the associated receiver inactive, whereby any station may transmit a steady carrier signal modulated with a message which will act to automatically break-in upon transmission from another station.

9. In a radio communication system providing two-way communication between a plurality of stations operating on the same carrier frequency, a radio transmitter and a radio receiver for each station both adapted to operate on the same carrier frequency, said receiver being normally active for the reception of a carrier signal and said transmitter being normally inactive, pulsing control means at each station effective when initiated into operation to cause said transmitter to transmit pulses of carrier signal separated by supersonic intervals and to cause said receiver to be inactive except during such supersonic intervals, lock out means at each station responsive to the reception of a carrier signal by its associated receiver when it is active for rendering said pulsing control means ineffective and for maintaining said receiver active until such carrier signal ceases, and manually governed means at each station operable to initiate its associated control means into operation only providing said lock out means at that station is not responding to the reception of a carrier signal from some other station.

10. In a radio communication system providing two-way communication between a plurality of stations operating on the same carrier frequency, a radio transmitter comprising multiple element vacuum tubes and a radio receiver comprising multiple element vacuum tubes for each station both adapted to operate on the same carrier frequency, said receiver being normally active for the reception of a carrier signal and said transmitter being normally inactive, manually governed means operable to render said receiver inactive and initiate operation of said transmitter to transmit a carrier signal capable of being modulated in accordance with a message, and lock out means at each station including a multiple element vacuum tube device governed by said receiver in response to the reception of a carrier signal for maintaining said receiver active and said transmitter inactive by governing the bias potentials of multiple element vacuum tubes of both said receiver and said transmitter irrespective of the condition of said manually governed means.

11. In a radio communication system providing two-way communication on the same carrier frequency, a superior station and an inferior station, each having a radio transmitter and receiver adapted to operate on the same carrier frequency said receivers being normally active for the reception of a carrier signal and said transmitters being normally inactive, control means at said superior station operable to initiate and maintain operation of said transmitter for transmitting a carrier signal modulated by a message and at the same time rendering the associated receiver inactive, control means at the inferior station operable to initiate operation of its transmitter for transmission of carrier signal modulated by a message and also to render its associated receiver inactive, pulsing means at said inferior station set into operation upon the initiation of its transmitter to recurringly interrupt the transmission of said carrier signal from that station for supersonic intervals and acting to render the associated receiver active during such intervals, and a lock out means at said inferior station responsive to the reception of a carrier signal by its associated receiver during any interruption of its associated transmitter while said control means is operated for continuing said receiver active and holding said transmitter inactive irrespective of said control means, whereby said stations may communicate messages in opposite directions alternately, but with said superior station capable of breaking in upon the transmission from said inferior station by its steady transmission of a carrier signal upon the next occurrence of a supersonic interruption of transmission from said inferior station.

12. In a radio communication system providing two-way communication on the same carrier frequency, one station having a radio transmitter and receiver with said receiver normally active and said transmitter normally inactive, control means at said one station manually operable to render the associated receiver inactive and initiate operation of its transmitter for the steady transmission of a carrier signal capable of being modulated with a message, another station having a radio transmitter and a radio receiver both adapted to operate on the same carrier frequency, said receiver being normally active and its associated transmitter being normally inactive, control means at said another station manually operable to render the associated receiver inactive and initiate operation of said transmitter, pulsing means at said another station conditioned by the operation of said control means for intermittently interrupting the operation of its associated transmitter for a supersonic interval at substantial time spaced periods and rendering the associated receiver active only during such interruptions, and lock out means at said another station rendered effective in response to the reception of a carrier signal by its associated receiver only when it is rendered active for maintaining said receiver active and said transmitter inactive until the reception of said carrier signal ceases, whereby the initiation of steady transmission of a carrier signal from said one station will be received at said another station during the next one of said interruptions and prevent such another station from further transmission so that said one station can thereby be effective to transmit a message of greater importance.

13. In a radio communication system providing for two-way communication on the same carrier frequency, two spaced stations each having a radio transmitter and receiver, and each receiver being normally rendered capable of receiving a carrier signal with the associated transmitter normally inactive, control means at each station manually operable to render the associated receiver inactive and to initiate operation of the associated transmitter for the transmission of a message by the modulation of a carrier signal, pulsing means at each station initiated into operation by the operation of its associated control means and acting to intermittently interrupt the operation of its transmitter at a supersonic rate and render the associated receiver active during such interruptions, and means at each station effective during the operated condition of said control means to act during the reception of a carrier signal to prevent the operation of said pulsing means to again render its transmitter active until such reception has ceased, whereby either station may transmit to the other, and whereby the operation of the control means at both stations at the same time permits the transmission of messages in both directions, the carrier signals carrying such messages being broken up into pulses which are transmitted in opposite directions alternately at such a fast rate as not to interfere with the intelligibility of the messages.

14. In a radio communication system providing two-way communication on the same carrier frequency, a station having a radio transmitter and receiver adapted to operate on the same carrier frequency and said receiver being normally rendered steadily effective to receive a carrier signal, control means operable to render the associated receiver inactive and to initiate operation of the associated transmitter, timing means set into operation by said control means when it is operated, pulsing means set into operation a predetermined time following the operation of said control means as measured by said timing means for intermittently interrupting transmission of the carrier signal from its station for supersonic periods of time and rendering the associated receiver effective to receive a carrier signal during such interruptions, and means controlled by said radio receiver in response to the reception of a carrier signal for rendering the associated transmitter inactive regardless of the operated condition of said control means, whereby the steady transmission of a carrier from another similar station during said predetermined time being measured at that station will be received during an interruption of transmission at this station and advise this station that another station is endeavouring to break in on its transmission so that said control means at this station can be restored to normal for establishing the normal effectiveness of its receiver.

15. In a radio communication system providing a two-way channel of communication on the same carrier frequency, two spaced stations each having a radio transmitter and receiver, control means at each station normally rendering the associated receiver steadily active for reception but manually operable to render its associated transmitter means active for the transmission of a message by the modulation of its carrier signal and at the same time render its associated receiver inactive for the reception of a carrier signal, electronic pulsing means at each station rendered active by the operation of said control means to intermittently interrupt the operation of the associated transmitter at a supersonic rate and render the associated receiver temporarily active during such interruptions, and means at each station acting in response to the reception of a carrier signal pulse from the other station to delay the operation of its associated electronic means, whereby transmission from either station can be received at the other station, and whereby the operation of the control means at both stations at the same time provides for transmission of modulated carrier signal pulses in opposite directions alternately to provide two-way communication.

16. In a radio communication system providing for two-way communication on the same carrier frequency, a plurality of stations each having a radio transmitter and a radio receiver adapted to operate on the same carrier frequency, control means associated with each station capable when set into operation to alternately render its transmitter and receiver active at a supersonic rate whereby messages may be transmitted by the modulation of the carrier signal pulses transmitted from that station, and synchronizing means at each station governed by the reception of carrier signal pulses at that station while its receiver is rendered active between pulses being transmitted to effect synchronization of the associated control means with the carrier pulses then being received from some other station, whereby two stations may hold simultaneous communication with each other, and manually operable means at each station effective for a limited time after its operation for causing that station to transmit a steady carrier signal independently of its associated control means, whereby any station may break in upon the transmission from any other station or any pair of other stations by the steady transmission of a carrier signal.

17. In a radio communication system providing two-way communication on the same carrier frequency, a plurality of stations each having a radio receiver and a radio transmitter adapted to operate on the same carrier frequency, control means at each station operative when manually set into operation to alternately render the associated receiver and transmitter active to thereby cause the station to transmit a succession of carrier signal pulses modulated in accordance with a voice message and rendering capable of receiving pulses interspersing such transmitted pulses, synchronizing means at each station rendered effective upon the reception of a carrier signal pulse by its associated receiver when it is active to cause the associated transmitter to remain inactive and the receiver to continue active irrespective of its control means until that pulse ceases, and manually operable means at each station effective when operated to cause the associated transmitter to transmit a steady carrier signal for modulation by a message independently of the associated control means, whereby any station can communicate with each of the other stations by two-way channel effectiveness, and whereby any station can break in upon the transmission from any other station of any pair of other stations then transmitting by reason of its transmission of a steady carrier signal acting at such other stations to maintain their receivers active and their transmitters inactive irrespective of their control means.

18. In a radio communication system providing two-way communication on the same carrier frequency, a plurality of stations each having a radio transmitter and a radio receiver both adapted to operate on the same carrier frequency, said receiver being normally steadily active for the reception of modulated carrier signals and said transmitters being normally inactive, control means at each station capable of manual initiation to cause the associated transmitter to be rendered effective to transmit pulses of carrier signal separated by short intervals during which the associated receiver is rendered active, said pulses being transmitted at a supersonic rate and a lock-out means at each station rendered effective by the reception of a carrier signal by its associated receiver to continue its receiver active and its transmitter inactive until the cessation of such carrier signal, whereby any pair of stations can transmit carrier signal pulses alternately in opposite directions at a supersonic rate to thereby permit two-way communication at will.

19. In a radio communication system providing two-way communication on the same carrier frequency, two spaced stations each having a radio transmitter and a radio receiver adapted to operate on the same carrier frequency, control means at each station operable to alternately render its associated transmitter and receiver active at a supersonic rate, and means at each station governed by the reception of a carrier signal by its associated receiver for delaying the next operation of its associated control means to render the associated transmitter active until the cessation of said carrier signal, whereby in the event both stations are operated at the same time carrier signals are transmitted in opposite directions alternately and communication can take place in either direction at will by the modulation of the carrier signal pulses transmitted in the corresponding direction.

20. In a radio communication system providing two-way communication on the same carrier frequency, a plurality of stations each having a radio transmitter and a radio receiver adapted to operate on the same carrier frequency, said receivers being normally steadily active and capable of rendering audible received carrier signals modulated with voice messages only within a predetermined range of audio frequencies and said transmitters being normally inactive, control means at each station effective when initiated into operation to cause the associated transmitter to be rendered active to transmit carrier signal pulses at a rate above said predetermined range of audio frequencies with the intervals between pulses being relatively short with respect to the duration of the pulses, means at each station for rendering its associated receiver active only during said intervals between pulses while the associated control means is active, and lock-out means at each station rendered effective by the reception of a carrier signal pulse by its associated receiver while it is rendered active during any of said intervals between pulses to continue its receiver steadily active and its transmitter inactive until the cessation of such carrier signal pulse, whereby any pair of stations can transmit carrier signal pulses alternately in opposite directions at a rate above that which can be reproduced by the audio portion of a receiver to thereby permit communication in either direction at will without apparent interruption.

21. In a radio communication system providing two-way communication on the same carrier frequency, a plurality of stations each having a radio transmitter and a radio receiver adapted to operate on the same carrier frequency, means associated with each of said receivers for allowing reproduction of voice messages only within a predetermined range of audio frequencies, control means at each station effective to cause the associated transmitter to transmit pulses of carrier signal separated by relatively short intervals during which the associated receiver is rendered active, and lock-out means at each station rendered effective by the reception of a carrier signal pulse during any one of the intervals in the operation of its associated transmitter to cause the continued reception of that pulse and to maintain its associated transmitter inactive until the cessation of such carrier signal pulse, whereby any station can transmit a message to any other station by modulating a succession of carrier signal pulses without the presence of the intervals between pulses being audible with respect to the station or stations receiving such message, and whereby any pair of stations can be operated at the same time to transmit carrier signal pulses alternately in opposite directions to permit the transmission of a voice message in either direction at any time during such operation of that pair of stations.

22. In a radio communication system providing two-way communication on the same carrier frequency, a superior station and a plurality of inferior stations, each having a radio transmitter and a radio receiver adapted to operate on the same carrier frequency, control means at each station normally rendering the associated receiver active but effective when set into operation to cause said transmitter to transmit pulses of carrier signal at a relatively high rate separated by short intervals too short to interfere with message transmission and causing said receiver to be active only during such intervals, lock-out means at each station responsive to the reception of a carrier signal by its associated receiver during any short interval while its associated control means is in operation for continuing said receiver active and holding said transmitter inactive irrespective of said control means until the cessation of such carrier signal, manually operable means at each inferior station effective for initiating said control means at that station into operation and being effective to cause steady transmission of a carrier signal by its transmitter for a limited time before allowing said pulsing transmission to take place, manually operable means at said superior station effective for initiating said control means at that station into operation and at times being effective to cause steady transmission of a carrier signal by its transmitter, whereby each inferior station may break in upon the transmission from any one or more other inferior stations by reason of its transmission of a steady carrier signal for a limited time, and whereby said superior station may break in upon the transmission from said inferior stations at any time except during the limited time following the initiation of an inferior station to break in upon some other station.

23. In a radio communication system providing two-way communication on the same carrier frequency a superior station and a plurality of inferior stations, each of said stations having a radio receiver and a radio transmitter adapted to operate on the same carrier frequency, manually operable means at the superior station normally allowing the associated receiver to be rendered steadily active but effective when operated to cause the receiver to be inactive and the associated transmitter to transmit a steady carrier signal that may be modulated in accordance with any desired voice message, control means at each of the inferior stations effective when set into operation to alternately render the associated transmitter and receiver active at a supersonic rate to thereby transmit a succession of carrier signal pulses that may be modulated in accordance with a voice message without affecting the intelligibility of such a message at the receiving station, and means at each station governed by the reception of a carrier signal pulse by its associated receiver when it is rendered active to continue the receiver active and to delay the operation of the associated control means until the cessation of that carrier signal pulse before the next pulse is transmitted by the associated transmitter, and manually operable means at each of the inferior stations for causing a steady transmission of a carrier signal by its associated transmitter independently of the associated control means only for a limited time after its initial operation, whereby any inferior station may break in upon the transmission of any other inferior station or pair of inferior stations that may then be transmitting, while said superior station can break in upon all inferior stations except during the limited time of operation of an associated manually operable means.

24. The method of one station breaking in on the transmission of another station operating on the same carrier frequency comprising radiating relatively closely spaced carrier wave pulses from said another station, suppressing the reception of said pulses at said another station, radiating a steady carrier wave from said one station, suppressing the reception of said steady carrier wave at said one station, receiving said steady carrier wave at said another station at the end of one of said pulses, and suppressing the radiation of said pulses from said another station for the duration of said steady carrier wave, wherein said one station breaks in on the transmission of said another station for the duration of the steady radiation from said one station, but said another station cannot break in on the transmission of said one station as long as said one station radiates a steady carrier wave.

25. The method of a superior station breaking in on the transmission of one of a plurality of inferior stations and one of said inferior stations breaking in on another inferior station to a limited extent, all of such stations operating on the same carrier frequency, comprising radiating relatively closely spaced carrier wave pulses of substantial length from one of said inferior stations, suppressing reception of each of said pulses at said one inferior station, receiving said pulses at another of said inferior stations, radiating relatively closely spaced carrier wave pulses of substantial length from said another of said inferior stations, suppressing reception at said another station of each of said carrier pulses radiated from that station, suppressing the radiation of pulses from said another station during the reception of each carrier pulse at that station, irrespective of the duration of that pulse, and radiating a steady carrier wave from said superior station, whereby one of said inferior stations breaks in on the transmission of another inferior station intermittently but said superior station suppresses radiation from all inferior stations for the duration of its steady carrier wave radiation.

26. The method of either of a plurality of stations breaking in upon the transmission of another station when operating on the same carrier frequency comprising transmitting a carrier frequency interrupted for supersonic intervals from one of said stations, suppressing the reception of said carrier at said one station, receiving said carrier at another station, suppressing transmission of a carrier from said another station while receiving a carrier from said one station except during said supersonic intervals, transmitting from said another station an initial carrier pulse of relatively long timed duration followed by a carrier interrupted for supersonic intervals, receiving said initial carrier pulse at said one station, and suppressing the transmission of said carrier at said one station upon the reception of said initial carrier pulse for the duration of that pulse, wherein the initiation of carrier transmission suppresses another station to gain superiority for a limited time only.

LYLE BROCKMAN.

REFERENCES CITED

The following references are of record in the file of this patent:

UNITED STATES PATENTS

| Number | Name | Date |
|---|---|---|
| 954,641 | Marconi | Apr. 12, 1910 |
| 1,480,216 | Mills | Jan. 8, 1924 |
| 2,045,224 | Gerhard | June 23, 1936 |
| 2,199,179 | Koch | Apr. 30, 1940 |
| 2,206,231 | MacKay | July 2, 1940 |
| 2,289,517 | Muehter | July 14, 1942 |
| 2,366,011 | Donaldson | Dec. 26, 1944 |
| 2,408,878 | Preston | Oct. 8, 1946 |
| 2,426,581 | Atkins | Sept. 2, 1947 |
| 2,433,281 | Lord | Dec. 23, 1947 |
| 2,435,010 | Knapp et al. | Jan. 27, 1948 |

FOREIGN PATENTS

| Number | Country | Date |
|---|---|---|
| 492,760 | Germany | Feb. 26, 1930 |